United States Patent [19]

Fukushima et al.

[11] Patent Number: 5,180,044
[45] Date of Patent: Jan. 19, 1993

[54] LIQUID VISCOUS DAMPER

[75] Inventors: Hirotaka Fukushima; Mitsuhiko Takenaka, both of Neyagawa, Japan

[73] Assignee: Kabushiki Kaisha Daikin Seisakusho, Osaka, Japan

[21] Appl. No.: 721,654

[22] PCT Filed: Dec. 17, 1990

[86] PCT No.: PCT/JP90/01586
§ 371 Date: Aug. 21, 1991
§ 102(e) Date: Aug. 21, 1991

[87] PCT Pub. No.: WO91/10078
PCT Pub. Date: Jul. 11, 1991

[30] Foreign Application Priority Data

Dec. 22, 1989 [JP] Japan .................. 1-148314

[51] Int. Cl.⁵ .............................................. F16D 3/80
[52] U.S. Cl. ............................... 192/106.1; 192/106.2; 192/70.17; 74/574; 464/66
[58] Field of Search ............... 192/106.1, 106.2, 70.17, 192/70.19; 74/574; 464/24, 66, 67, 68

[56] References Cited

U.S. PATENT DOCUMENTS

| 4,474,276 | 10/1984 | Loizeau | 192/106.1 |
|---|---|---|---|
| 4,475,640 | 10/1984 | Takeuchi et al. | 192/106.1 X |
| 4,564,097 | 1/1986 | Kabayama | 192/106.1 |
| 4,662,239 | 5/1987 | Wörner et al. | 74/574 |
| 4,729,465 | 3/1988 | Reik | 192/106.2 |
| 4,739,866 | 4/1988 | Reik et al. | 192/70.17 |
| 4,760,754 | 8/1988 | Friedman | 74/574 |
| 4,775,042 | 10/1988 | Kohno et al. | 192/106.2 |
| 4,782,933 | 11/1988 | Jäckel et al. | 192/70.18 |
| 4,932,286 | 6/1990 | Fukushima | 74/574 |
| 4,944,499 | 7/1990 | Tojima | 74/574 X |
| 4,944,712 | 7/1990 | Wörner et al. | 74/574 X |
| 4,983,142 | 1/1991 | Despres et al. | 74/574 X |
| 5,009,301 | 4/1991 | Spitler | 192/106.2 |
| 5,025,904 | 6/1991 | Graton et al. | 192/106.2 |
| 5,030,166 | 7/1991 | Wörner | 74/574 X |
| 5,072,818 | 12/1991 | Kuhne | 464/68 X |

FOREIGN PATENT DOCUMENTS

| 3806013 | 9/1989 | Fed. Rep. of Germany | 192/106.1 |
|---|---|---|---|
| 2593252 | 7/1987 | France | 192/106.1 |

Primary Examiner—Rodney H. Bonck
Assistant Examiner—Andrea Pitts
Attorney, Agent, or Firm—Armstrong & Kubovcik

[57] ABSTRACT

A viscous liquid damper having a damper for developing a torsion torque in between an output-side driven plate (23) and an input-side drive plate (3), and a liquid chamber located between the drive plates (3) is partitioned into front and rear divided chamber (38 & 39) in rotation direction. In order to allow absorption of vibrations of different kinds without mutual confrontation in such a damper; an outward facing projection (41) is formed on the drive plate (3), a slider (40) is mated with the drive plate (3) in such a manner as slidable in the rotation direction, a main choke (A1) is formed between the slider (40) and the projection (41), stoppers (40a) able to mate with the projection (41) are formed on circumferential both ends of the slider (40), and a sub-choke (S2) connecting the both divided chambers (38 & 39) is formed separately from the main choke (S1).

1 Claim, 4 Drawing Sheets

LIQUID VISCOUS DAMPER

BACKGROUND OF THE INVENTION

1. Field of the Invention

This invention relates to a damper which is used for a torsional vibration damper which couples an engine flywheel with a transmission input shaft or for a damper disc for an automobile clutch, and especially to a liquid viscous damper which develops a hysteresis torque by means of a viscosity of liquid.

2. Description of the Related Art

A damper of such type is generally equipped with a output-side driven plate and an input-side drive plate which houses the foregoing driven plate by covering both sides and outer peripheral side of the driven plate, and has a damper mechanism for developing a torsional torque between the both plates.

Divided liquid chambers 38 & 39 are formed in a drive plate 3 as shown in FIG. 5, liquid is filled in these chambers and a choke S1 is provided between the divided liquid chambers 38 & 39. The choke S1 is formed between a notch 60 formed on a driven plate 23 and an inward facing projection 62 formed on the drive plate 3.

In order to let a hysteresis torque change in two stages for example, a stepped part 61 is formed on a midway of the notch 60 so that, when the drive plate 3 is twisted relatively to the driven plate 23 from a state of FIG. 5 for example to a rotation direction R side by $\theta 1$ or to an opposite to the rotation direction R side by $\theta 2$, a clearance of the choke S1 is changed from d1 to d2 and the hysteresis torque is increased from H1 to H2 as shown by FIG. 6. However, in the event a structure which changes the hysteresis torque by only the torsion angle of the drive plate 3 relative to the driven plate 23 is employed, it becomes impossible to develop the small hysteresis torque H2 in response to circumstances in a large torsion angle range and further it becomes impossible to develop the large hysteresis torque in response to circumstances in a small torsion angle range.

SUMMARY OF THE INVENTION

An object of this invention is to cope with a cycle-by-cycle variation of combustion and a vibration of car body without mutual confrontation, in such a manner as to allow a small viscous force to work when an operating angle is small arising in case of the cycle-by-cycle variation of combustion, and allowing a large viscous force to work when the operating angle is large accompanied by the vibration of the car body regardless of the range of the twisting angle.

In order to accomplish the above object, this invention provides a liquid viscous damper in which an output-side driven plate and an input-side drive plate housing the foregoing driven plate by covering both sides and outer peripheral side of the foregoing driven plate are installed, a damper mechanism for developing a torsional torque is installed in between the both plates, a liquid chamber is formed between the drive plates and filled with liquid, the liquid chamber is partitioned into circumferential front and rear divided-chambers, and the both divided chambers are connected by chokes; characterized by an outward facing projection protruding into the liquid chamber which is formed on the driven plate, a slider is which fitted onto the drive plate in such a manner as slidable in a rotation direction, a main choke which is formed between the slider and the projection, stoppers which are able to mate with the projection at circumferential both ends of the slider are formed with spaces left between them in the rotation direction, and a sub-choke connecting the both divided chambers which is formed separately from the main choke.

Under a state where the projection does not contact with the stoppers of the slider, the liquid flows from one divided chamber to the other divided chamber mainly through the main choke when the drive plate is twisted relatively to the driven plate. At the same time, it flows also through the sub-choke.

Consequently, a flow sectional area of the liquid which flows from one divided chamber to the other divided chamber becomes large, so that a flow resistance thereby becomes small and a small hysteresis torque is developed.

When the torsion angle is increased to cause the projection to contact with the stopper, the main choke is brought into a closed state and the liquid flows into the other divided chamber mainly through the sub-choke. Consequently, the flow sectional area becomes small so that the flow resistance .becomes large and a large hysteresis torque is developed.

DESCRIPTION OF THE PREFERRED EMBODIMENTS

Figure 1:
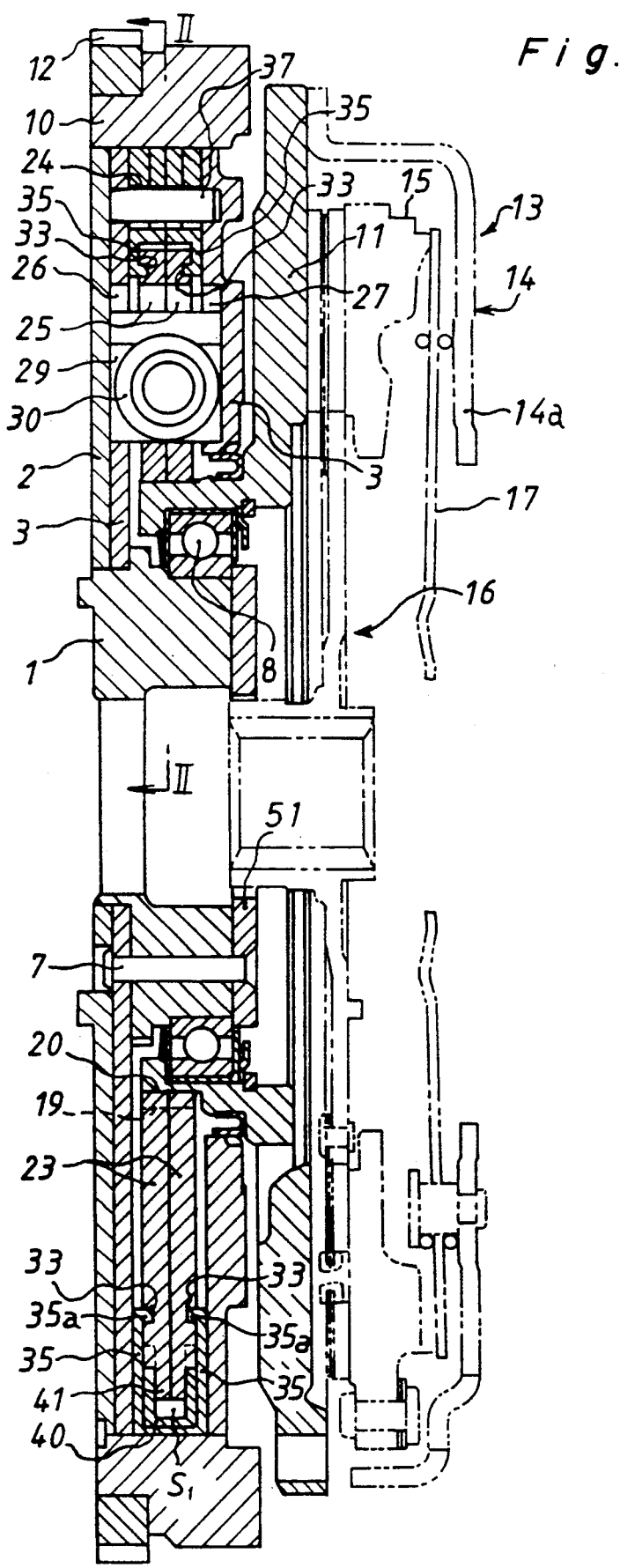
FIG. 1 is a vertical sectional view of the liquid viscous damper to which this invention is applied (corresponding to a sectional view taken on a line I—I of FIG. 2).

FIG. 1 shows a vertical sectional view of the liquid viscous damper to which this invention is applied. An input-side hub 1 is coupled to a crank-shaft of an engine. A stopper plate 51 and a drive plate 3 are fastened to the hub 1 by rivets 7, and a cover plate 2 is fastened to hub 1. A first flywheel 10 having a ring gear 12 is secured to outer peripheral end portions of the drive plate 3 and the cover plate 2. An output-side second flywheel 11 is rotatably fitted onto an outer periphery of the input-side hub 1 through a bearing 8, and a clutch 13 is connected to an end face of the second flywheel 11. The clutch is composed of a clutch disc 16 and a clutch cover 14 secured to the second flywheel and including a cover 14a, a pressure plate 15 and a diaphragm spring 17, etc., and the clutch disc 16 is coupled to a transmission input-shaft, for example.

An output-side driven plate 23 comprising a pair of left and right disc members is disposed between the drive plates 3, and wave-like teeth 20 of the driven plates 23 mesh with wave-like teeth 19 of the second flywheel 11 so that they rotate integrally with the second flywheel 11.

Plural holes 25 are made on the driven plates 23 with spaces left between them in the rotation direction, holes 26 and concave portions 27 are formed on the drive plate 3 at places corresponding to the respective holes 25, and coil springs 30 for generating torsion torque are installed in the holes 25 & 26 and the concave portions 27 in such a manner as to be compressible in the rotation direction. The holes 26 of one-side drive plate 3 are blocked by the cover plate 2.

An annular liquid chamber housing 35 is held at radial outsides of the driven plates 23, a section of the liquid chamber 35 is formed into a U-shape opening toward the axis, and the housing is fastened to the drive plates 3 by a pin 37 A pair of annular projections 35a are formed at a radial inward end portion of the liquid chamber housing 35, and the annular projections 35a fit in and seal annular grooves 33 formed on radial outward both sides of the driven plates 23.

The housing 35 is divided into left and right (both sides in the axial direction) pieces and at the same time divided into five pieces in the rotation direction, so that it is composed of totally ten circular arc housing members 35A. Boss/dam portions 35c having pin passing holes 24 are formed circumferentially on both ends of each housing member 35A, and a notch 50 opening to an inside is formed at a circumferential central portion. The dam portions 35c of the housing members 35A are placed over one another and connected by pins 37 as described above, so that the housing is assembled into the annular shape.

A slider 40 serving as a main orifice is installed in the housing 35 so as to be slidable in the rotation direction. The slider 40 is formed into a box-shape opening to the inward side, and its radial outward outer peripheral wall is formed into a circular arc shape fitting to an inside surface of an outer peripheral wall 35b of the housing 35. A pair of leg portions 43 is formed on its inward sides of circumferential both ends, and a space between the leg portions 43 forms a liquid flowing opening portion 44.

Figure 2:
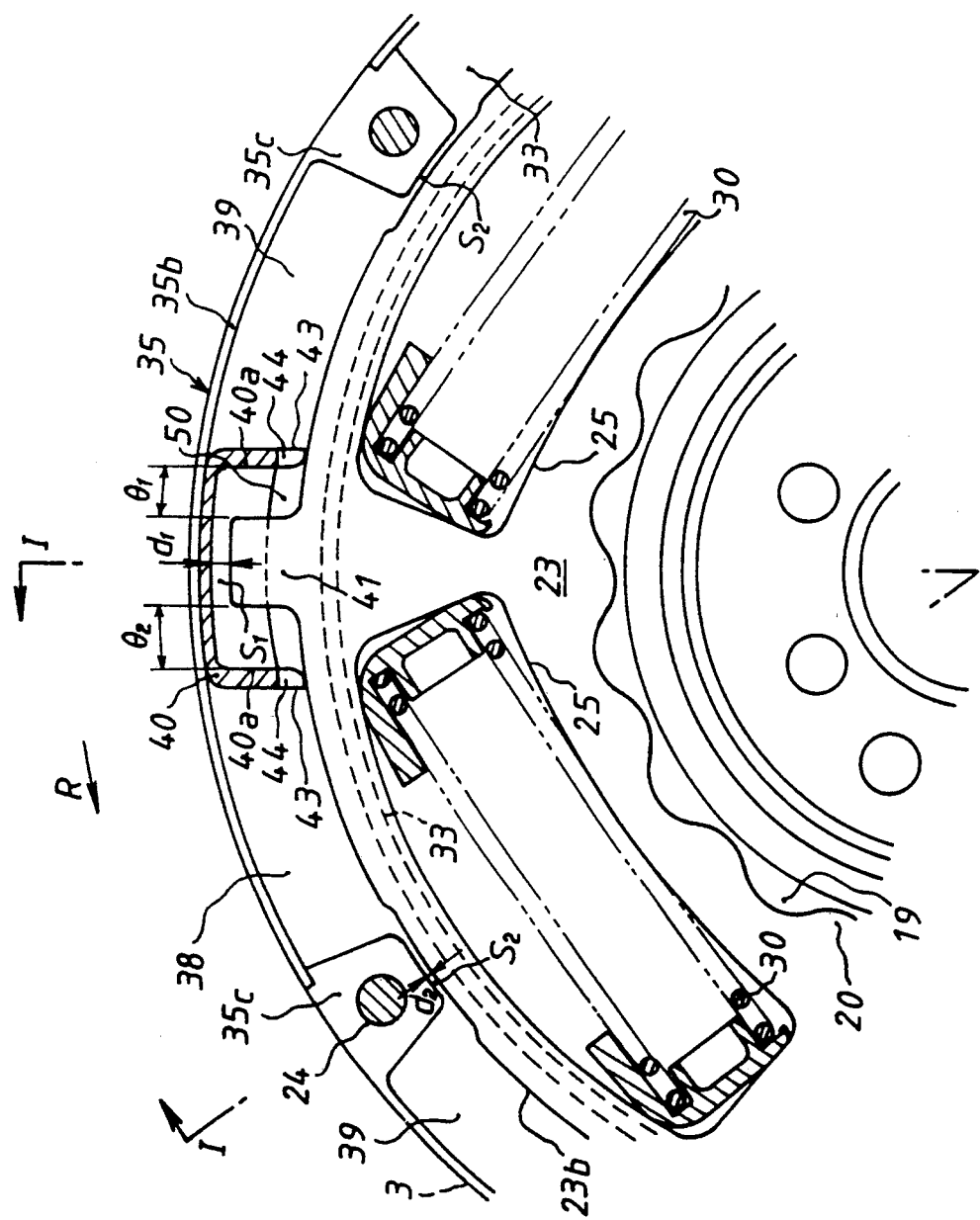
FIG. 2 is a partial sectional view taken on a line II—II of FIG. 1.
Figure 3:
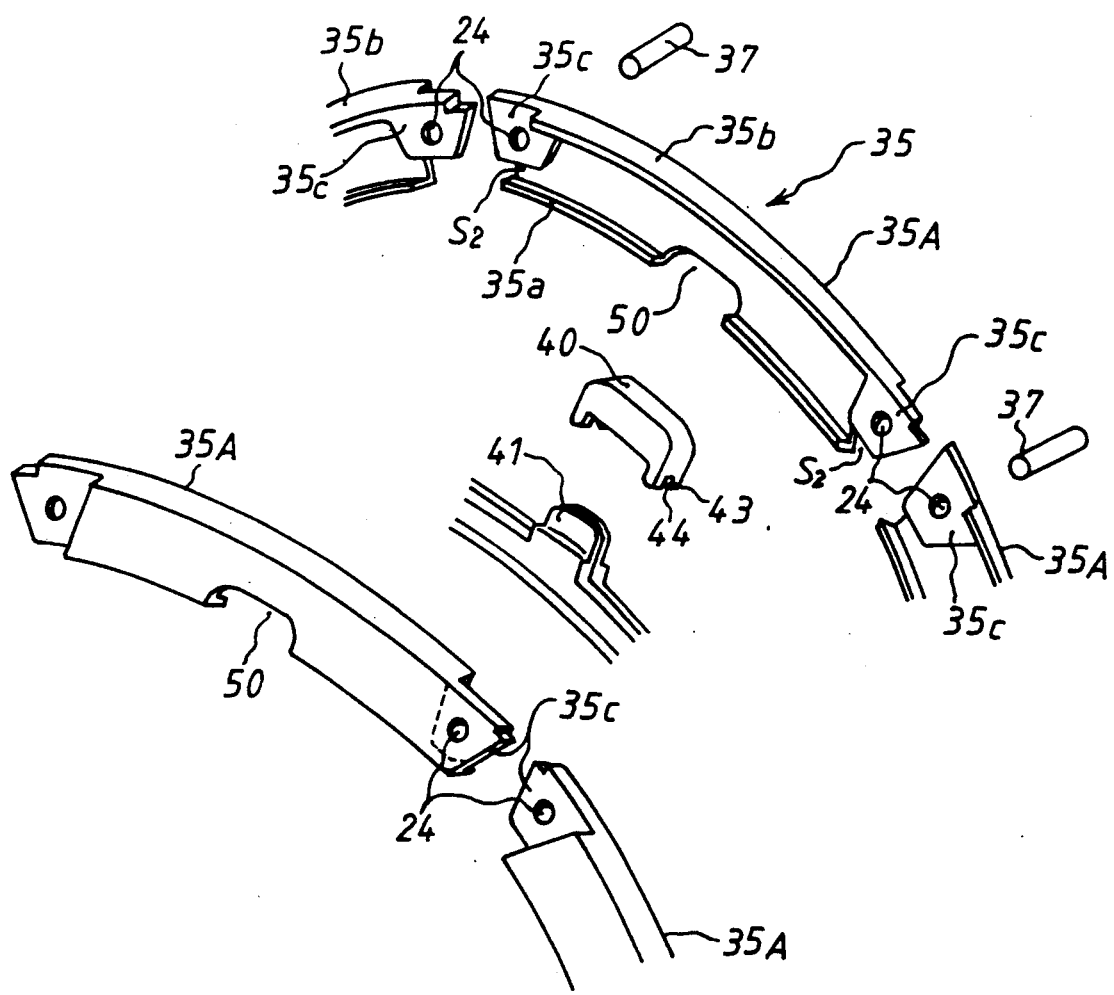
FIG. 3 is a partial oblique exploded view of a liquid chamber housing, etc.
Figure 4:
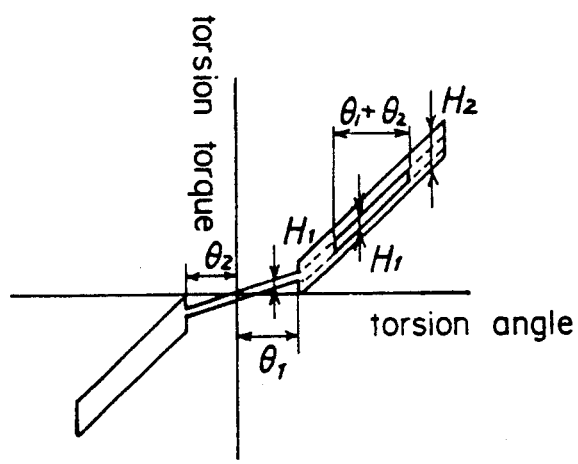
FIG. 4 is a torsion characteristic diagram for a case in which this invention is applied.
Figure 6:
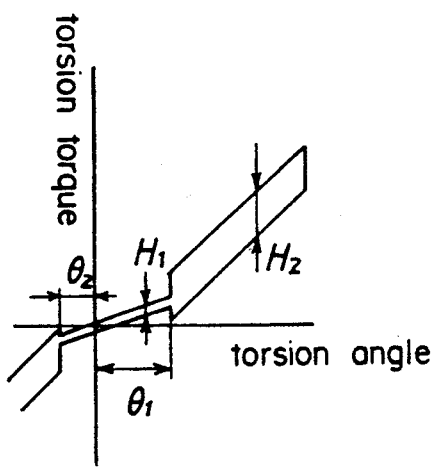
FIG. 6 is a torsion characteristic diagram of the conventional embodiment.
Figure 5:
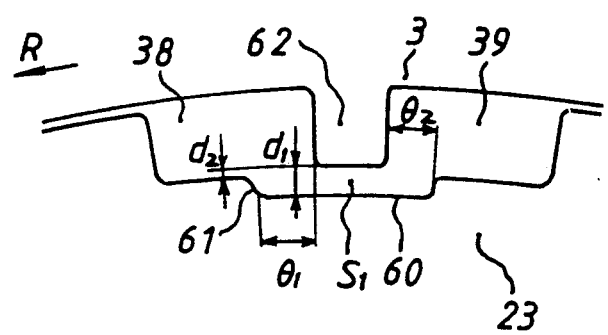
FIG. 5 is a sectional view of a conventional embodiment on the same part as FIG. 1.

In FIG. 2, the leg portions 43 of the slider 40 contact with and slide on an outer peripheral edge of the driven plate 23, a projection 41 protruding outwardly in the radial direction is formed on a radial outward outer peripheral end of the driven plate 23, and the projection 41 protrudes into the slider 40. Circumferential both side walls of the slider 40 form stoppers 40a & 40a and are spaced in the circumferential direction with angles of $\theta 1$ and $\theta 2$ left between them in the circumferential direction in relation to the projection 41 when the engine is stopped. The projection 41 partitions a liquid chamber between the dam portions 35c into a first divided chamber 38 located at a circumferential front side and a second divided chamber 39 located at a circumferential rear side, and a main choke S1 connecting the both divided chambers 38 & 39 is formed between the projection 41 and an inside surface of the slider 40.

A sub-choke S2 connecting both divided chambers 38 & 39 is also formed between a radial inside edge of the dam portion 35c and an outside edge of the driven plate 23. A clearance d1 of the main choke S1 is made larger than a clearance d2 of the sub-choke S2. In other words, a flow sectional area of the sub-choke S2 is smaller than a flow sectional area of the main choke S1.

The function of the present invention will be described hereunder. The drive plates 3 is twisted to the circumferential front side or rear side relatively to the driven plates 23 at a time when a torsion is developed. The coil spring 30 is not compressed yet within a small torsion angle, for instance, within the forward torsion angle $\theta 1$ or the backward torsion angle $\theta 2$, but the coil spring 30 begins to be compressed when the torsion angle becomes large.

Development of and a change in hysteresis torque, which is caused by a movement of liquid when the torsion torque is produced, will be explained hereunder. Under a state where the projection 41 does not contact with the stoppers 40a of the slider 40 as shown by FIG. 2, the housing 35 together with the slider 40 move to the rotation direction R side when the drive plate 3 is twisted, for example, to the rotation direction R side relatively to the driven plate 23. The second divided chamber 39 is thereby compressed to become small and the first divided chamber 38 becomes large, and the liquid flows from the second divided chamber 39 to the first divided chamber 38 mainly through the opening portion 44 and the main choke S1. It further flows into the first divided chamber 38 through a clearance between an outer peripheral side surface of the slider 40 and the housing 35, and further flows from the second divided chamber 39 into the first divided chamber 39 through the sub-choke S2 too.

Accordingly, the flow sectional area of fluid flowing from the second divided chamber 39 to the first divided chamber 38 becomes large and the flow resistance thereby becomes small, so that a small hysteresis torque is developed.

When the torsion angle becomes large to cause the the rear-side stopper 40a to contact with the projection 41, the main choke S1 is brought into a closed state. At the same time, the slider 40 is stopped by the projection 41, and the drive plate 3 and the housing 35 move to the front side i.e. in the rotation direction R relatively to the driven plate 23 and the slider 40. In this instance, the liquid in the second divided chamber 39 flows through the sub-choke S2 to the rear-side first divided chamber 38 and at the same time passes through a clearance between an outer peripheral side surface of the slider 40 and the housing to the first divided chamber 38 too. Accordingly, the flow sectional area becomes small to produce a large flow resistance and develop a large hysteresis torque.

When the drive plate 3 is twisted backward after being twisted forward as described in the above case, the projection 41 is separated from the rear-side stopper 40a of the slider 40 immediately after beginning of the backward twisting to cause the main choke S1 to open. The liquid flows from the first divided-chamber 38 to the second divided-chamber 39 mainly through the main choke S1 and the sub-choke S2 within a rotation angle range of $\theta 1 + \theta 2$ so that a small hysteresis torque is developed.

Even when a small torsional fluctuation is produced due to the cycle-by-cycle variation of combustion, for example, under a state where the drive plate 3 is twisted at a specified angle relatively to the driven plate 23, the slider 40 will vibrate within the angle range of $\theta 1 + \theta 2$. Therefore, a small hysteresis torque can be maintained because the main choke S1 is opened.

Namely, a timing of change in the hysteresis torque is not determined by the torsion angle of the drive plate 3 relative to the driven plate 23, but a largeness of the hysteresis torque is determined by a positional relation of the slider 40 to the projection 41.

The embodiment shown above is applied to the damper which utilizes the coil spring for developing the twisting torque, however, it can also be applied to a damper which utilizes the liquid viscosity for developing the twisting torque too.

The embodiment shown above can also be applied to a damper developing two-stage twisting characteristic by installing a first-stage coil spring having a weak spring force or a damper having a three-stage twisting characteristic.

In the present invention as described above, the outward facing projection 41 protruding into the liquid chamber is formed on the driven plate 23, the slider 40 is fitted at the drive plate 3 side in such the manner as slidable in the circumferential direction, the main choke S1 is formed between the slider 40 and the foregoing projection 41, the stoppers 40a above to mate with the projection 41 are formed on circumferential both ends of the slider 40 with a space left between them in the circumferential direction, and the sub-choke S2 connecting the both divided chambers 38 & 39 is formed separately from the main choke S1. Therefore, the hysteresis torque will be changed by the position of the slider 40 relative to the projection 41 regardless of the twisting angle of the drive plate 3 in relation to the driven plate 23. Consequently, when the operating angle is small, such as in case of the cycle-by-cycle variation of combustion, a small viscous force is exerted and the hysteresis torque can be controlled and reduced to a minimum because the main choke A1 is opened.

On the other hand, in case of a large operating angle accompanied by the vibration of car body, the projection 41 contacts with the stopper 40a to close the main choke S1 so that a large viscous force is exerted and the hysteresis torque becomes large.

Accordingly, fluctuations such as the cycle-by-cycle variation and the vibration of a car body can be absorbed effectively without any confrontation.

Since the fluctuations such as the cycle-by-cycle variation and the vibration of car body can be absorbed effectively without any confrontation, the damper of this invention is most suitable for damper discs for use in automobile clutches.

What is claimed is:

1. A liquid viscous damper in which an output-side driven plate and an input-side drive plate housing the foregoing driven plate by covering both sides and outer peripheral side of the foregoing driven plate are installed, a damper mechanism for developing a torisonal torque is installed in between the both plates, a liquid chamber is formed between the drive and driven plates and filled with liquid, the liquid chamber is partitioned into circumferential front and rear divided-chambers, and the divided chambers are connected by chokes; a main choke, characterized by projections formed on the outer periphery of the driven plate and protruding into the liquid chamber, a slider is fitted onto the drive plate in such a manner as slidable in a rotational direction, a main choke is formed between the slider and the projection, stoppers above to mate with the projection at circumferential both ends of the slider are formed with spaces left between them in the rotational direction, and a sub-choke connecting the divided chambers is formed separately from the main choke.

* * * * *